(12) United States Patent
Kim et al.

(10) Patent No.: US 8,478,033 B2
(45) Date of Patent: Jul. 2, 2013

(54) IMAGE INSPECTION APPARATUS AND METHOD

(75) Inventors: Jin Seo Kim, Daejeon (KR); Maeng Sub Cho, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1372 days.

(21) Appl. No.: 11/734,324

(22) Filed: Apr. 12, 2007

(65) Prior Publication Data

US 2008/0118145 A1 May 22, 2008

(30) Foreign Application Priority Data

Nov. 16, 2006 (KR) .................. 10-2006-0113237

(51) Int. Cl.
*G06K 9/00* (2006.01)
(52) U.S. Cl.
USPC ........... 382/165; 382/162; 382/164; 382/167; 382/264; 382/305; 358/1.9; 358/2.1; 358/3.24; 358/504

(58) Field of Classification Search
USPC ... 382/162, 164, 165, 167, 305, 264; 358/1.9, 358/2.1, 3.24, 504, 527, 462, 518, 519, 520, 358/447, 521, 523
See application file for complete search history.

(56) References Cited

U.S. PATENT DOCUMENTS

| | | | |
|---|---|---|---|
| 6,721,449 B1 * | 4/2004 | Krishnamachari | 382/165 |
| 6,721,499 B2 * | 4/2004 | Watanabe et al. | 396/127 |
| 7,136,523 B2 * | 11/2006 | Fukao et al. | 382/167 |
| 7,376,269 B2 * | 5/2008 | Klassen et al. | 382/167 |
| 7,706,604 B2 * | 4/2010 | Berns et al. | 382/162 |
| 2002/0104457 A1 * | 8/2002 | Brydges et al. | 101/484 |
| 2005/0248786 A1 * | 11/2005 | Tobie et al. | 358/1.9 |
| 2006/0110009 A1 * | 5/2006 | Klassen et al. | 382/112 |
| 2007/0013959 A1 * | 1/2007 | Miwa | 358/304 |
| 2007/0154084 A1 * | 7/2007 | Kang et al. | 382/162 |

FOREIGN PATENT DOCUMENTS

JP 07154620 A * 6/1995

(Continued)

OTHER PUBLICATIONS

Choi, J.G., et al., "Suitability Test of MPEG-7 Visual Descriptors as an Identifier of Modified Images.".

(Continued)

*Primary Examiner* — Mekonen Bekele
(74) *Attorney, Agent, or Firm* — Ladas & Parry LLP (57) ABSTRACT

An image inspection apparatus determines whether a test image is a copy of an original image. The image inspection apparatus includes an image group generation unit that determines one or more types of image transform, and transforms the original image according to the determined types of image transform to generate an original image group; a spatial color difference computing unit that transforms a color space of the generated original image group, and calculates first spatial color differences between the original image and images in the original image group to provide color difference data; an image inspection unit that receives the test image and the original image group to calculate second spatial color differences between the test image and the images in the original image group, and compares the second spatial color differences to the color difference data; and an inspection result output unit that outputs the comparison result.

14 Claims, 5 Drawing Sheets

FOREIGN PATENT DOCUMENTS

| | | |
|---|---|---|
| JP | 07-175923 | 7/1995 |
| JP | 2003244452 A * | 8/2003 |
| KR | 10-2002-0009077 | 2/2002 |
| KR | 10-2002-0032906 | 5/2002 |
| KR | 20020097450 | 12/2002 |
| KR | 1020060002358 A | 1/2006 |

OTHER PUBLICATIONS

Xuemei Zhang et al; "A Spatial Extension of CIELAB for Digital Color Image Reproduction", Society for International Development (SD) Journal, 1997, 6 pages.

* cited by examiner

IMAGE INSPECTION APPARATUS AND METHOD

FIELD OF THE INVENTION

The present invention relates to image inspection technology and, more particularly, to an image inspection apparatus and method adaptive to identify copied images by calculating spatial color differences based on an original image.

BACKGROUND OF THE INVENTION

It is well known that, with the rapid development of the Internet, it has become popular to post various images, captured by using cameras and/or edited by using personal terminals such as personal computers, on Internet forums, homepages and blogs.

In this case, images produced by an individual may be copied illegally to be posted at other places or to be used for purposes other than originally intended ones.

To solve such problems, for example, watermarking method has been used to prevent illegal image copies. However, in this method, a watermark must be inserted into an image at the time that it is produced. Therefore, this method has drawbacks in that image copies become difficult to detect if someone deletes the watermark, and copied images become difficult to identify if someone deletes the watermark of the image and changes colors thereof or edits some portions thereof.

Further, regarding the identification of copied images from an original image, a thesis entitled "Suitability Test of MPEG-7 Visual Descriptors as an Identifier of Modified Images" (published on Feb. 3, 2006) is presented at FCV2006. This thesis discloses a method of identifying and inspecting copies of an original image based on a color distribution, a texture, an edge histogram and the like of the original image by using six descriptors (namely, scalable color descriptor, color layout descriptor, color structure descriptor, homogeneous texture descriptor, edge histogram descriptor and region based descriptor) that are supported by MPEG-7. However, it is still difficult to detect copies that are modified or edited from the original image by using the method disclosed in the above-mentioned thesis.

As a further example of the conventional art, Korean Patent Application No. 10-2000-063655 (entitled "System and Method for protecting Copyright and Preventing Infringement of Copyright on Internet," which is filed on Oct. 28, 2000) discloses a method of protecting copyrights by preventing infringements on the Internet. In this method, a copyright search server, which includes a search agent; a query interface unit; a query processor; a search engine; a pattern analyzer; a token management unit; an audio; image signal pattern processor; a pattern matching unit; a storage management unit; a storage unit; a charge payment module; and a copyright search result storage unit, is constructed on the Internet or an intra-network. The copyright search server provides Internet search results in response to a query made by a copyright holder by comparing patterns of documents or moving images, and determines whether the copyright has been infringed to protect the copyright holder's interests by preventing illegal copies from being distributed without authorization. However, the above-described method is also of limited use in the identification and inspection of copies that are modified and edited from the original image.

SUMMARY OF THE INVENTION

It is, therefore, an object of the present invention to provide an image inspection apparatus and method for generating an original image group by transforming an original image, calculating spatial color differences from the original image group to store the calculated spatial color difference data, and determining whether a test image is a copy of the original image based on the stored spatial color difference data.

Further, it is another object of the present invention is to provide an image inspection apparatus and method for comparing the color difference data to spatial color differences between a test image and images in an original image group, thus performing inspection to determine whether the test image is a copy of the original image.

In accordance with an embodiment of the present invention, there is provided an image inspection apparatus for determining whether a test image is a copy of an original image, including an image group generation unit that receives the original image to determine one or more types of image transform, and transforms the original image according to the determined types of image transform to generate an original image group; a spatial color difference computing unit that transforms a color space of the generated original image group, and calculates first spatial color differences between the original image and images in the original image group to provide color difference data obtained from the calculated spatial color differences; an image inspection unit that receives the test image and the original image group to calculate second spatial color differences between the test image and the images in the original image group, and compares the second spatial color differences to the color difference data to generate a comparison result; and an inspection result output unit that outputs the comparison result.

In accordance with another embodiment of the present invention, there is provided An image inspection method of determining whether a test image is a copy of an original image, including a first step of generating an original image group by transforming the original image according to one or more types of image transform; a second step of making a database of color difference data obtained by transforming a color space of the original image group and calculating first spatial color differences between the original image and images in the original image group; a third step of, upon receiving a request for image inspection while the database of the color difference data is available, providing the test image and the original image group; a fourth step of calculating second special color differences between the test image and the images in the original image group; a fifth step of comparing the second special color differences to the color difference data in the database; and a sixth step of determining whether the test image is a copy of the original image based on the comparison result of the fifth step.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

In accordance with the present invention, an original image group is first generated by transforming the original image according to one or more determined types of image transform. Then, by using the generated original image group, a color space transform is performed and first spatial color differences, between the original image and images in the original image group, are calculated, thereby organizing a database of the first spatial color differences. Thereafter, upon receiving a test image and the original image group, second spatial color differences, between the test image and the images in the original image group, are computed to be compared to the first spatial color differences in the database. Thus, according to the comparison result, it is determined whether the test image is copied from the original image. The objects of the present invention can be accomplished by using the above-described technical means.

Figure 1:
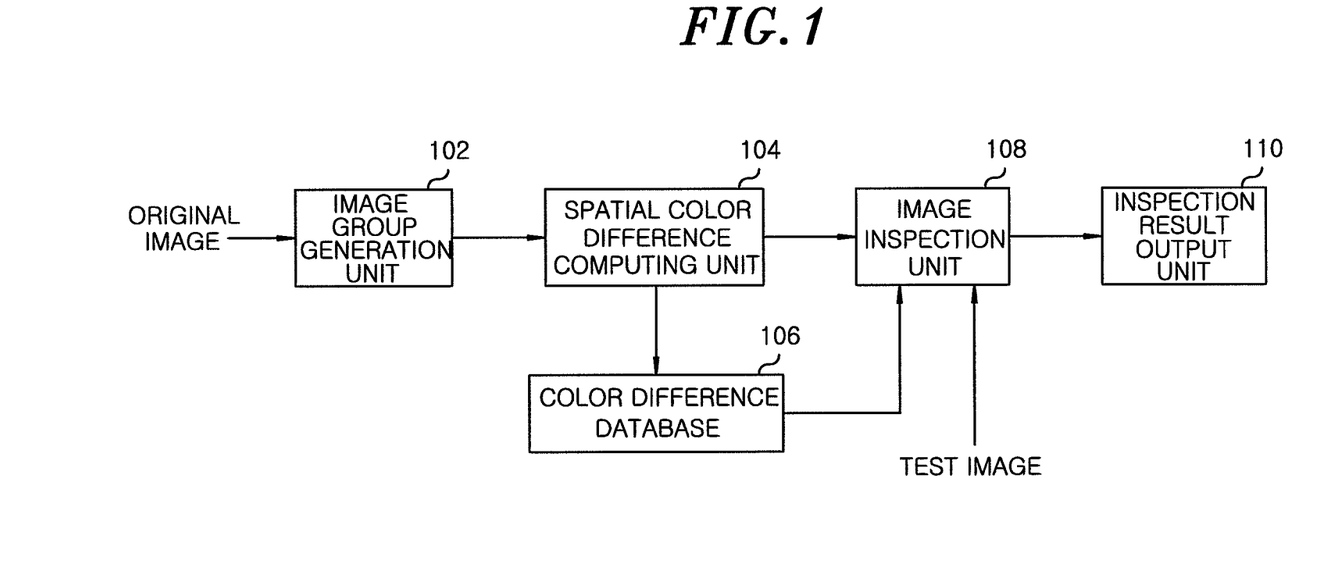
FIG. 1 is a block diagram schematically showing the configuration of an image inspection apparatus that uses spatial color difference calculation according to an embodiment of the present invention.

FIG. 1 is a block diagram schematically showing the configuration of an image inspection apparatus that uses spatial color difference calculation according to an embodiment of the present invention. The image inspection apparatus includes an image group generation unit 102; a spatial color difference computing unit 104; a color difference database 106; an image inspection unit 108; and an inspection result output unit 110.

Referring to FIG. 1, the image group generation unit 102 receives an original image, and generates an original image group according to one or more determined types of image transform. When the original image is inputted and the types of image transform are determined, one or more image factors, among those including contrast, sharpness, brightness, gamma, noise, color, size and the like, are determined to be transformed according to the determined types of image transform. Then, the image group generation unit 102 performs five levels of image transform according to the determined types of image transform, and generates the original image group from the original image and images obtained by the image transform.

Further, the spatial color difference computing unit 104 calculates first spatial color differences between the original image and the images in the original image group, i.e., the images obtained by the image transform, by using a specific color difference calculation method such as S-CIELAB. Then, the results of the calculation are organized into the color difference database 106 as color difference data in association with the original image and the original image group.

Meanwhile, upon receiving a test image that is to be inspected, the image inspection unit 108 inspects to determine whether the test image is equivalent to an image that belongs to the original image group by using the color difference data stored in the color difference database 106 in association with the original image and the original image group. Then, the image inspection unit 108 calculates second spatial color differences between the test image and the images in the original image group, and compares the calculated second spatial color differences to the color difference data, thereby generating the result of the comparison.

The inspection result output unit 110 outputs the result of the comparison regarding whether the test image is copied from the original image as the result of the inspection.

Hereinafter, the image group generation unit in the image inspection apparatus of the above-described configuration, which generates the original image group in response to the original image and transforms the original image according to one or more determined types of image transform, will be described in greater detail.

Figure 2:
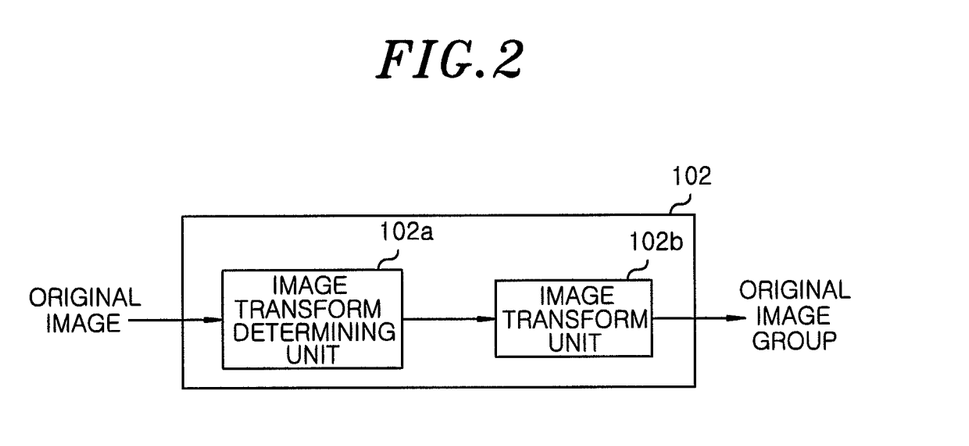
FIG. 2 is a block diagram showing, in detail, an image group generation unit for generating an original image group according to an embodiment of the present invention.

FIG. 2 is a block diagram showing, in detail, the image group generation unit for generating an original image group according to an embodiment of the present invention. The image group generation unit includes an image transform determining unit 102a and an image transform unit 102b.

Referring to FIG. 2, the image transform determining unit 102a selects one or more types of image transform, which are to be used for an inputted original image, from among various types of image transform respectively corresponding to one of the image factors including contrast, sharpness, brightness, noise, size and the like. Then, the information of the determined types of image transform is transferred to the image transform unit 102b.

Thereafter, in accordance with the types of image transform determined by the image transform determining unit 102a, the image transform unit 102b performs five levels of image transform ranging from a fifth level, which corresponds to the highest degree of transform, to a first level, which corresponds to the lowest degree of transform. The degrees of transform are converted from one to another by adjusting transform values such that the differences between the levels of image transform are visually distinguished from one another. In this manner, the original image is transformed according to the determined types of image transform and, thus, images obtained by the transform are grouped along with the original image to form an original image group. Thus generated original image group is provided to the spatial color difference transform unit 104.

Hereinafter, the spatial color difference computing unit, which transforms the original image group into a specified color space, and then calculates and stores the first spatial color differences depending on the specified color space, will be described in greater detail.

Figure 3:
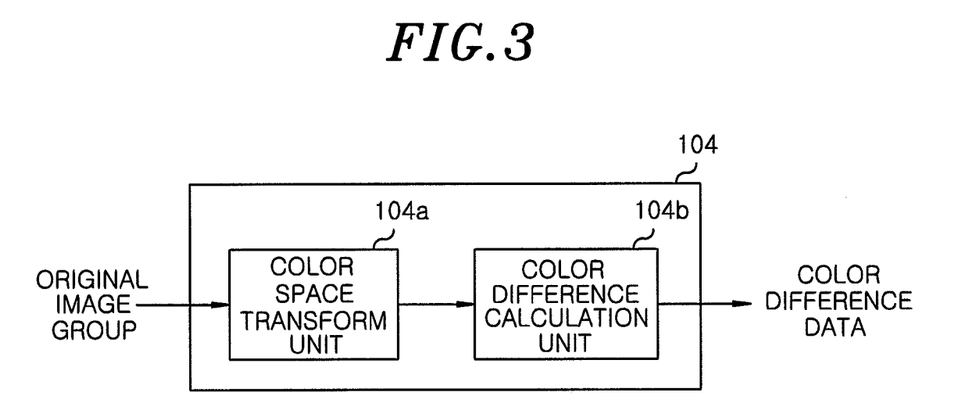
FIG. 3 is a block diagram showing, in detail, a spatial color difference computing unit for calculating and storing spatial color differences according to an embodiment of the present invention.

FIG. 3 is a block diagram showing, in detail, the spatial color difference computing unit for calculating and storing spatial color difference according to an embodiment of the present invention. The spatial color difference computing unit includes a color space transform unit 104a and a color difference calculation unit 104b.

Referring to FIG. 3, the color space transform unit 104a transforms the color space of input images that belong to the received original image group. That is, the color space transform unit 104a transforms an RGB color space (in which R, G and B designate red, green and blue components, respectively) or a YCbCr color space (in which Y represents a luma component, and Cb and Cr represent blue and red chroma components, respectively) into, e.g., an S-CIELAB color space that is for calculating the first spatial color differences. In this case, the transform into the S-CIELAB color space may be performed by using the method disclosed in a thesis entitled "Spatial Extension of CIELAB for digital color image reproduction", published in the Society for International Development (SID) Journal by Zhang and Wandell in the year 1997.

Hereinafter, the transform into the color space is described in grater detail. To performed this transform, it is required that the input images be represented in a color space. If the colors of the original image are represented in a YCbCr color space, the YCbCr color space is first transformed into an RGB space by using Eq. 1:

$$\begin{bmatrix} R \\ G \\ B \end{bmatrix} = \begin{bmatrix} 1.0000 & 0.0000 & 1.4020 \\ 1.0000 & -0.3441 & -0.7141 \\ 1.0000 & 1.7720 & 0.0000 \end{bmatrix} \begin{bmatrix} Y \\ Cb \\ Cr \end{bmatrix}$$
Eq. 1

Then, the color values transformed into RGB values are transformed again into an XYZ space, which is a color space independent of the device, by using Eq. 2:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix}$$
Eq. 2

Subsequently, opposite attributes are calculated from XYZ color values corresponding to respective pixels of the image by using Eq. 3:

$$\begin{bmatrix} OP1 \\ OP2 \\ OP3 \end{bmatrix} = \begin{bmatrix} 0.279 & 0.72 & -0.107 \\ -0.449 & 0.29 & -0.077 \\ 0.086 & -0.59 & 0.501 \end{bmatrix} \begin{bmatrix} X \\ Y \\ Z \end{bmatrix}$$
Eq. 3

Here, OP1 denotes the luminance attribute of the images, OP2 denotes the red-green attribute of the images, and OP3 denotes the blue-yellow attribute of the images. For all the three types of images corresponding to OP1, OP2 and OP3 of each inputted image, the following calculations of Eq. 4 are performed by applying a two-dimensional spatial filter.

$$f = k \sum_i w_i E_i$$
Eq. 4 where $E_i$ is defined by Eq. 5.

$$E_i = K_i \exp[-(x^2+y^2)/\sigma_i^2]$$
Eq. 5

Then, OP1', OP2' and OP3' that are obtained from the calculation using the two-dimensional spatial filter are transformed into an XYZ color space by using Eq. 6.

$$\begin{bmatrix} X \\ Y \\ Z \end{bmatrix} = \begin{bmatrix} 0.6266 & -1.8672 & -0.1532 \\ 1.3699 & 0.9348 & 0.4362 \\ 1.5057 & 1.4213 & 2.5360 \end{bmatrix} \begin{bmatrix} OP1' \\ OP2' \\ OP3' \end{bmatrix}$$
Eq. 6

Subsequently, the XYZ color space, which is obtained by the transform, is transformed into an L*, a* and b* color space by using Eq. 7:

$$L^* = 116 \left( \frac{Y}{Y_n} \right)^{1/3} - 16 \text{ for } \frac{Y}{Y_n} > 0.008856$$
Eq. 7

$$L^* = 903.3 \left( \frac{Y}{Y_n} \right) \text{ for } \frac{Y}{Y_n} \leq 0.08856$$

$$a^* = 500 \left[ \left( \frac{X}{X_n} \right)^{1/3} - \left( \frac{Y}{Y_n} \right)^{1/3} \right]$$

$$b^* = 200 \left[ \left( \frac{Y}{Y_n} \right)^{1/3} - \left( \frac{Z}{Z_n} \right)^{1/3} \right]$$

$$C^*_{ab} = [(a^*)^2 + (b^*)^2]^{1/2}$$

where L* denotes a pixel lightness and $C^*_{ab}$ denotes a chroma corresponding to a pixel color value. When the transform into the $L^*_{ab}$ color space (i.e., L*, a* and b* color space) is performed through the above-described process, images obtained through the above-described color space transform are transferred to the color difference calculation unit 104b.

Subsequently, the color difference calculation unit 104b calculates the image differences between the original image and the images obtained by the transform, by using Eq. 8.

$$CD = \sqrt{(L^*_2 - L^*_1)^2 + (a^*_2 - a^*_1)^2 + (b^*_2 - b^*_1)^2}$$
Eq. 8

Accordingly, color difference data about the first spatial color differences, between the original image and the images obtained by the transform, is put into the color difference database 106 in association with the original image and the original image group.

Hereinafter, the image inspection unit will be described in greater detail. The image inspection unit calculates second spatial color differences between the test image and the images in the original image group by using the color difference data stored in association with the original image and the original image group, compares the calculated second spatial color differences to the color difference data, and determines whether the test image is copied from the original image.

Figure 4:
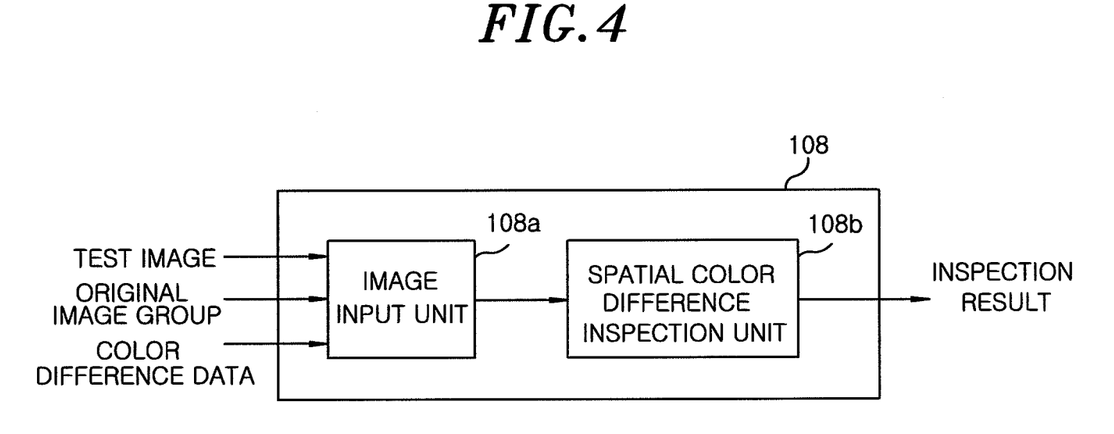
FIG. 4 is a block diagram showing, in detail, an image inspection unit for determining whether a test image is copied from an original image according to an embodiment of the present invention.

FIG. 4 is a block diagram showing, in detail, the image inspection unit for determining whether a test image is copied from an original image according to an embodiment of the present invention. The image inspection unit includes an image input unit 108a and a spatial color difference inspection unit 108b.

Referring to FIG. 4, the image input unit 108a receives the original image group, the test image and the color difference data, and transfers the original image group, the test image and the color difference data to the image inspection unit 108b.

The image inspection unit 108b calculates second spatial color differences between the test image and the images in the original image group from the original image group, the test image and the color difference data, which are inputted through the image input unit 108a, compares the calculated second spatial color differences to the color difference data, and transfers the result of the comparison to the image inspection output unit 110. In this case, the second spatial color differences between the test image and the images in the original image group can be performed by using the above-described equations Eqs. 1 to 8.

As described above, the image inspection apparatus can efficiently perform the inspection to determine whether a test image is copied from the original image by generating an original image group by transforming the original image according to the determined types of image transform, calculating the first spatial color differences for the generated original image group, putting color difference data obtained from the calculation into the database, receiving the test image, calculating the second spatial color differences between the test image and the images in the original image group, and comparing the second spatial color differences to the color difference data.

Hereinafter, the process performed in the image inspection apparatus of the above-described configuration will be described in detail. This process includes the steps of generating an original image group by receiving an original image and transforming the original image according to the determined types of image transform; calculating spatial color differences for the original image group; and organizing the color difference data, obtained from the calculation, into a database.

Figure 5:
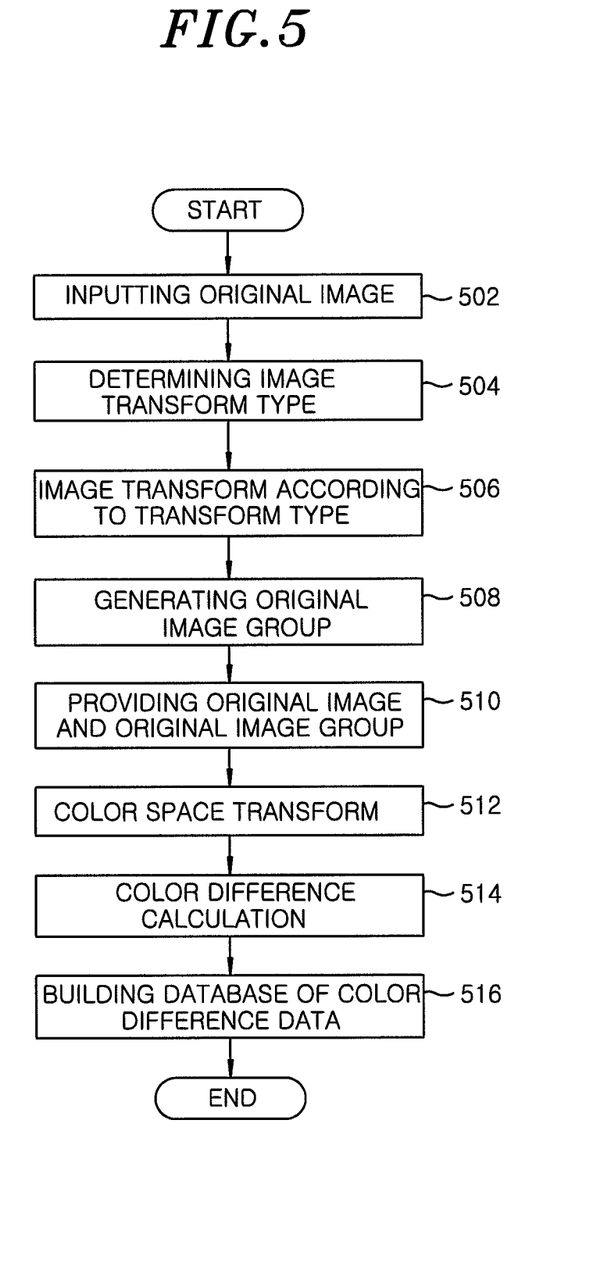
FIG. 5 is a flowchart illustrating a process of calculating spatial color differences for an original image group, which is generated according to determined types of image transform, and storing color difference data, which is obtained from the calculation, according to an embodiment of the present invention.

FIG. 5 is a flowchart illustrating a process of calculating spatial color difference for an original image group, which is generated according to the determined types of image transform, and storing color difference data obtained from the calculation according to an embodiment of the present invention.

Referring to FIG. 5, an original image is inputted to the image transform determining unit 102a of the image group generation unit 102 in the image inspection apparatus at step 502. Then, the image transform determining unit 102a selects one or more types of image transform from among various types of image transform, respectively corresponding to image factors including contrast, sharpness, brightness, noise, size and the like, for the inputted original image, and sends information of the determined types of image transform to the image transform unit 102b at step 504.

Thereafter, in accordance with the types of image transform determined by the image transform determining unit 102a, the image transform unit 102b performs at step 506 the five levels of image transform ranging from the fifth image transform step, which corresponds to the highest degree of transform, to the first level, which corresponds to the lowest degree of transform. The degrees of transform are converted from one to another by adjusting transform values such that the differences between the levels of image transform are visually distinguished from one another.

The original image is transformed according to the determined types of image transform and, thus, the images obtained by the transform are grouped along with the original image into an original image group at step 508. Then, at step 510, thus created original image group is provided to the spatial color difference transform unit 104.

Thereafter, at step 512, the color space transforms the color space of input images that belong to the received original image group. That is, the color space transform unit 104a transforms an RGB color space (in which R, G and B designate red, green and blue components, respectively) or a YCbCr color space (in which Y represents a luma component, and Cb and Cr represent blue and red chroma components, respectively) into, e.g., an S-CIELAB color space that is for calculating the first spatial color differences. In this case, the transform into the S-CIELAB color space may be performed by using the method disclosed in the above-mentioned thesis by Zhang and Wandell.

Thereafter, the color difference calculation unit 104b calculates at step 514 the image differences between the original image and the images obtained by the transform, by using Eq. 8. Then, at step 516, color difference data of the spatial color differences between the original image and the images obtained by the transform is put into the color difference database 106 in association with the original image and the original image group.

Thus, the image inspection apparatus can generate an original image group by transforming the input original image according to the determined types of image transform; perform a color space transform of the original image group; calculate the spatial color differences for the images obtained by the color space transform, and organize color difference data, obtained by the calculation, into the database.

Hereinafter, the process regarding the inspection of the test image will be described in detail. While the color difference data for the original image group based on the original image is organized into the database as described above, the following steps are performed: receiving a test image; calculating the second spatial color differences between the test image and the images in the original image group; comparing the calculated second spatial color differences to the stored color difference data; and performing the inspection to determine whether the test image is copied from the original image according to the result of the comparison.

Figure 6:
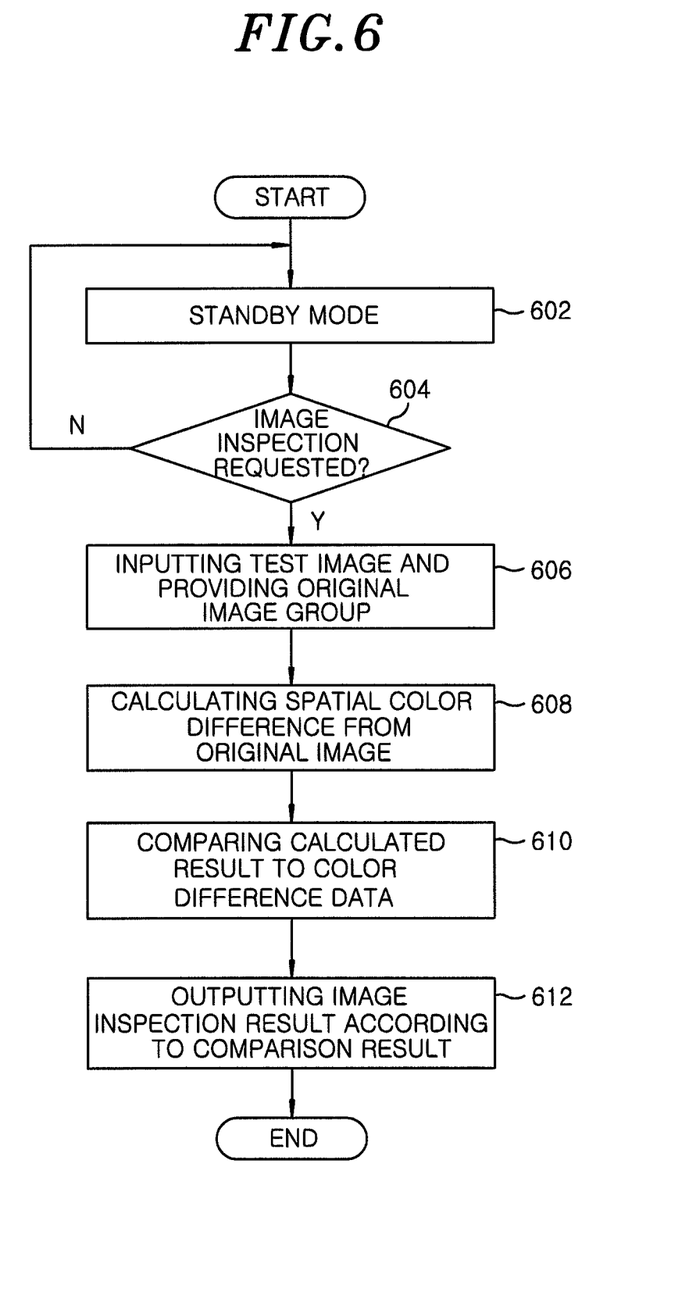
FIG. 6 is a flowchart of performing inspection for determining whether a test image is copied from an original image while a database is established by using the color difference data according to an embodiment of the present invention.

FIG. 6 is a flowchart illustrating a process of performing the inspection for determining whether a test image is a copy of an original image while the color difference data is stored in a database according to an embodiment of the present invention.

Referring to FIG. 6, the image inspection apparatus enters a standby mode at step 602, in which the color difference data of the original image group based on the original image is put into the database. Thereafter, it is determined at step 604 whether an image inspection is requested to performing the inspection for determining whether the test image is copied from the original image.

If it is determined at step 604 that an image inspection is requested, the test image and the original image group are provided to the image input unit 108a at step 606. In this case, the color difference data stored in the color difference database 106 is also provided thereto.

Then, the image inspection unit 108b calculates at step 608 the second spatial color differences between the test image and the images in the original image group, and compares at step 610 the calculated second spatial color differences to the color difference data provided from the color difference database 106.

Thereafter, at step 612, the image inspection unit 108b determines whether the test image is copied from the original image according to the result of the comparison at the step 610, and provides the result of the determination to the image inspection output unit 110 to output the result of the determination. Thereafter, the provided result of the determination, i.e., the image inspection result including information of whether the test image is copied from the original image, is outputted through the image inspection output unit 110.

Thus, if an inspection is requested to inspect whether the test image is copied from the original image while the color difference data for the original image group, which is obtained by the transform according to the determined types of image transform, is put into the database, the image inspection apparatus calculates the second spatial color differences between the test image and the images in the original image group, and compares the calculated second spatial color differences to the stored color difference data. In this manner, it can be efficiently determined whether the test image is copied from the original image. As described above, the conventional methods detect image copies, e.g., by inspecting a watermark in the image, or by comparing documents or moving image patterns to provide Internet search results in response to the copyright holder's query. However, unlike such conventional methods, in accordance with the present invention, an original image group is generated by transforming the original image according to one or more types of image transform; a database of color difference data, obtained by transforming a color space of the original image group and calculating first spatial color differences between the original image and images in the original image group, is created; the test image and the original image group are inputted upon receiving a request for image inspection while the database of the color difference data is available; second special color differences, between the test image and the images in the original image group, are calculated; the second special color differences are compared to the color difference data in the database. Thus, it can be efficiently determined whether the test image is copied from the original image.

That is, in accordance with the present invention, it is inspected whether an image has been copied by others by using spatial color differences. In this manner, it is possible to inspect images distributed on the Internet, so that it can be efficiently determined whether an image has been copied by others to protect the copyrights of the image by preventing the image from being used by others without authorization.

While the invention has been shown and described with respect to the embodiments, it will be understood by those skilled in the art that various changes and modifications may be made without departing from the scope of the invention as defined in the following claims.

What is claimed is:

1. An image inspection apparatus for determining whether a test image is a copy of an original image, comprising:
    an image group generation unit that receives the original image to determine one or more types of image transform, and performs the one or more types of image transform on the original image according to the determined types of image transform within a color space to generate an original image group, wherein the original image group comprises the original image and a plurality of images generated by said transforming;
    a spatial color difference computing unit that transforms the color space of each of the images in the generated original image group to a common color space for calculating first spatial color differences, and calculates the first spatial color differences between the original image and images among the images in the original image group generated by the one or more types of image transform performed by the image group generation unit to provide color difference data corresponding to the first spatial color differences;
    an image inspection unit that receives the test image and the original image group and calculates second spatial color differences between the test image and the images in the original image group, and compares the second spatial color differences to the color difference data corresponding to the first spatial color differences to generate a comparison result, wherein the image inspection unit includes an image input unit that receives the original image group, the test image, and the color difference data corresponding to the first spatial color differences; and
    an inspection result output unit that outputs the comparison result.

2. The image inspection apparatus of claim 1, further comprising:
    a color difference database that stores therein the color difference data in association with the original image and the original image group.

3. The image inspection apparatus of claim 1, wherein the image group generation unit includes:
    an image transform determining unit that receives the original image and determines the types of image transform; and
    an image transform unit that transforms an image factor of the original image according to the determined types of image transform to generate the original image group.

4. The image inspection apparatus of claim 3, wherein the image factor is selected to be transformed depending on the type of image transform, the image factor including contrast, sharpness, brightness, noise, color and size.

5. The image inspection apparatus of claim 1, wherein the spatial color difference computing unit includes:
    a color space transform unit that transforms an RGB or YCC color space of the original image group into an S-CIELAB color space; and
    a color difference calculation unit that calculates the first spatial color differences between the original image and the images in the original image group, whose color space has been transformed into the S-CIELAB color space, to provide the color difference data.

6. The image inspection apparatus of claim 1, wherein the image inspection unit further includes:
    a spatial color difference inspection unit that calculates the second spatial color differences between the received test image and the images in the original image group, and compares the second spatial color differences to the received color difference data corresponding to the first spatial color differences to determine whether the test image is a copy of the original image based on the comparison result.

7. An image inspection method of determining whether a test image is a copy of an original image, comprising:
    a first step of generating an original image group by transforming the original image according to one or more types of image transform within a color space, wherein the original image group comprises the original image and a plurality of images obtained by said transforming;
    a second step of organizing a database of color difference data obtained by transforming the color space of each of the images in the original image group to a common color space and calculating first spatial color differences between the original image and images among the images in the original image group;
    a third step of, upon receiving a request for image inspection while the database of the color difference data is available, receiving, by an image input unit the original image group, the test image, and the color difference data corresponding to the first spatial color differences and providing the original image group, the test image, and the color difference data corresponding to the first spatial color differences to a spatial color difference inspection unit;
    a fourth step of calculating, by the spatial color difference inspection unit, second spatial color differences between the test image and the images in the original image group;
    a fifth step of comparing, by the spatial color difference inspection unit, the second spatial color differences to the color difference data corresponding to the first spatial color differences in the database and generating a comparison result; and
    a sixth step of determining whether the test image is a copy of the original image based on the comparison result of the fifth step.

8. The image inspection method of claim 7, wherein the first step includes the substeps of:
    receiving the original image to determine the types of image transform; and generating the original image group by transforming the original image according to the determined types of image transform.

9. The image inspection method of claim 7, wherein the second step includes the substeps of:
- transforming an RGB or YCC color space of the original image group into an S-CIELAB color space;
- calculating the first spatial color differences between the original image and the images in the original image group, whose color space has been transformed into the S-CIELAB color space, to provide the color difference data obtained from the first spatial color differences; and
- organizing the database of the color difference data by associating the first spatial color differences with the original image and the original image group.

10. The image inspection method of claim 9, wherein the image factor is selected to be transformed depending on the type of image transform, the image factor including contrast, sharpness, brightness, noise, color and size.

11. An image inspection apparatus for determining whether a test image is a copy of an original image, comprising:
- an image group generation unit comprising an image transform determining unit and an image transform unit, wherein the image transform determining unit receives the original image to determine one or more types of image transform, and the image transform unit performs a plurality of levels of each of the one or more types of image transform on the original image according to the determined types of image transform to generate an original image group, each of the plurality of levels corresponding to a different degree of transform;
- a spatial color difference computing unit that transforms a color space of the each of the images original image group to a common color space, and calculates first spatial color differences between the original image and images in the original image group to provide color difference data corresponding to the first spatial color differences;
- an image inspection unit that receives the test image and the original image group and calculates second spatial color differences between the test image and the images in the original image group, and compares the second spatial color differences to the color difference data corresponding to the first spatial color differences to generate a comparison result, wherein the image inspection unit includes an image input unit that receives the original image group, the test image and the color difference data corresponding to the first spatial color differences; and
- an inspection result output unit that outputs the comparison result.

12. The image inspection apparatus of claim 11, further comprising:
- a color difference database that stores therein the color difference data in association with the original image and the original image group.

13. The image inspection apparatus of claim 11, wherein the spatial color difference computing unit includes:
- a color space transform unit that transforms an RGB or YCC color space of the original image group into an S-CIELAB color space; and
- a color difference calculation unit that calculates the first spatial color differences between the original image and the images in the original image group, whose color space has been transformed into the S-CIELAB color space, to provide the color difference data.

14. The image inspection apparatus of claim 11, wherein the image inspection unit includes:
- a spatial color difference inspection unit that calculates the second spatial color differences between the received test image and the images in the original image group, and compares the second spatial color differences to the received color difference data corresponding to the first spatial color differences to determine whether the test image is a copy of the original image based on the comparison result.

* * * * *